US010699365B2

(12) United States Patent
Ma

(10) Patent No.: US 10,699,365 B2
(45) Date of Patent: Jun. 30, 2020

(54) METHOD, APPARATUS, AND STORAGE MEDIUM FOR PROCESSING PARTICLE SYSTEM

(71) Applicant: TENCENT TECHNOLOGY (SHENZHEN) COMPANY LIMITED, Shenzhen (CN)

(72) Inventor: Xiaofei Ma, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 62 days.

(21) Appl. No.: 16/052,265

(22) Filed: Aug. 1, 2018

(65) Prior Publication Data

US 2018/0342041 A1    Nov. 29, 2018

Related U.S. Application Data

(63) Continuation of application No. PCT/CN2017/083917, filed on May 11, 2017.

(30) Foreign Application Priority Data

May 16, 2016  (CN) .......................... 2016 1 0324183

(51) Int. Cl.
*G06T 1/20*  (2006.01)
*G06T 11/00*  (2006.01)
(Continued)

(52) U.S. Cl.
CPC ............. *G06T 1/20* (2013.01); *G06F 9/485* (2013.01); *G06T 11/00* (2013.01); *G06T 13/00* (2013.01);
(Continued)

(58) Field of Classification Search
None
See application file for complete search history.

(56) References Cited

U.S. PATENT DOCUMENTS 8,289,327 B1    10/2012  Horvath
2004/0193392 A1*  9/2004  Williams ............ G06F 17/5018
                                                     703/2
(Continued)

FOREIGN PATENT DOCUMENTS

CN    1753031 A    3/2006
CN    101452582 A    6/2009
(Continued)

OTHER PUBLICATIONS

Object-Oriented Programming Basics With JAVA, pp. 1-48, 2003, https://www.cs.usfca.edu/~parrt/doc/java/OOProgWithJava-notes.pdf.*
(Continued)

*Primary Examiner* — Frank S Chen
(74) *Attorney, Agent, or Firm* — Anova Law Group, PLLC

(57) ABSTRACT

A method, apparatus, and storage medium for processing a particle system are provided. In the method, general attribute information of a target particle system sent by a CPU is received. The general attribute information of the target particle system includes a particle display range, a particle life cycle range, a particle velocity range, and a generation time. Particles of the target particle system are generated according to the general attribute information of the target particle system. Particle attributes of the particles of the target particle system are initialized. The particle attributes of each particle include position information, velocity information, a life cycle and a generation time of the particle. The particles of the target particle system are displayed accord-
(Continued)

ing to the particle attributes of the particles of the target particle system.

18 Claims, 7 Drawing Sheets

(51) Int. Cl.
    *G06T 13/00*     (2011.01)
    *G06F 9/48*     (2006.01)
    *G06T 15/00*     (2011.01)

(52) U.S. Cl.
    CPC ........ *G06T 15/005* (2013.01); *G06T 2210/56* (2013.01)

(56) References Cited

U.S. PATENT DOCUMENTS

| | | | | |
|---|---|---|---|---|
| 2006/0155576 | A1* | 7/2006 | Deluz | G16H 40/63 705/2 |
| 2017/0236321 | A1* | 8/2017 | Robbins | G06T 15/005 345/506 |

FOREIGN PATENT DOCUMENTS

| | | |
|---|---|---|
| CN | 102426692 A | 4/2012 |
| CN | 102722859 A | 10/2012 |
| CN | 102982506 A | 3/2013 |
| CN | 103714568 A | 4/2014 |
| CN | 104022756 A | 9/2014 |
| CN | 104571993 A | 4/2015 |
| CN | 104700446 A | 6/2015 |
| JP | 2010507865 A | 3/2010 |
| KR | 20080050271 A | 6/2008 |
| KR | 20080050970 A | 6/2008 |

OTHER PUBLICATIONS

The State Intellectual Property Office of the People's Republic of China (SIPO) Office Action 1 for 201610324183.1 dated Nov. 1, 2018 12 Pages (including translation).

The State Intellectual Property Office of the People's Republic of China (SIPO) Office Action 2 for 201610324183.1 dated Jan. 21, 2019 13 Pages (including translation).

Yuxiang Shan et al., "Real-Time Rendering of Large-Scale Snow Scene", Journal of Computer-Aided Design & Computer Graphics, Aug. 31, 2013 (Aug. 31, 2013), p. 1137-1145. 9 Pages.

The World Intellectual Property Organization (WIPO) International Search Report for PCT/CN2017/083917 dated Aug. 15, 2017 6 Pages (including translation).

Korean Intellectual Property Office (KIPO) Notification of Reason for Refusal for 10-2018-7018114 dated Mar. 31, 2019 12 Pages (including translation).

\* cited by examiner

METHOD, APPARATUS, AND STORAGE MEDIUM FOR PROCESSING PARTICLE SYSTEM

RELATED APPLICATIONS

This application is a continuation application of PCT Patent Application No. PCT/CN2017/083917, filed on May 11, 2017, which claims priority to Chinese Patent Application No. 201610324183.1, filed with the Chinese Patent Office on May 16, 2016, and entitled "PROCESSING METHOD AND DEVICE FOR PARTICLE SYSTEM", all of which is incorporated by reference in their entirety.

FIELD OF THE TECHNOLOGY

The present disclosure relates to the field of computer graphic technologies, and in particular, to a method, apparatus, and storage medium for processing a particle system.

BACKGROUND OF THE DISCLOSURE

Visual simulation of a characteristic effect of an irregular phenomenon, such as smoke, fire, cloud, fog, or a waterfall, is an extremely challenging research subject in computer graphics. A specific shape and a characteristic effect are very difficult to be really described by using a conventional modeling method.

Nowadays, a particle system is usually used to present the characteristic effect of the irregular phenomenon, and the particle system can simulate a complex movement system. Position updating, death detection, and the like of particles in the particle system need to be processed by a central processing unit (CPU), and a graphics processing unit (GPU) displays the particles in the particle system according to the processing result. The process can consume a large amount of CPU time. Meanwhile, in the processing process of the CPU, the GPU needs to be in a lock waiting state. After the CPU generates particles and updates positions, the GPU can display the particles according to data updated by the CPU. Consequently, the processing efficiency is low.

SUMMARY

Embodiments of the present disclosure provide a method, apparatus, and storage medium for processing a particle system, to improve the processing efficiency of the particle system.

An embodiment of the present disclosure provides a processing method for a particle system. The method includes receiving general attribute information of a target particle system sent by a CPU. The general attribute information of the target particle system includes a particle display range, a particle life cycle range, a particle velocity range, and a generation time. The method also includes generating particles of the target particle system according to the general attribute information of the target particle system, and initializing particle attributes of the particles of the target particle system. The particle attributes of each particle includes position information, velocity information, a life cycle and a generation time of the particle. The method also includes displaying the particles of the target particle system according to the particle attributes of the particles in the target particle system.

Correspondingly, an embodiment of the present disclosure further provides a processing apparatus for a particle system, including: a memory, storing instructions for a processing method for the particle system; and a graphics processing unit (GPU), connected to the memory. When the instructions are executed, the GPU is configured to: receive general attribute information of a target particle system sent by a CPU. The GPU is also configured to generate particles of the target particle system according to the general attribute information of the target particle system, and initialize particle attributes of the particles of the target particle system. The particle attributes of each particle includes position information, velocity information, a life cycle and a generation time of the particle. The GPU is also configured to display the particles of the target particle system according to the particle attributes of the particles in the target particle system.

An embodiment of the present disclosure further provides a non-volatile machine-readable storage medium storing computer program instructions executable by a graphics processing unit (GPU). The computer program instructions can cause the GPU to perform: receiving general attribute information of a target particle system sent by a central processing unit CPU. The general attribute information of the target particle system includes a particle display range, a particle life cycle range, a particle velocity range, and a generation time. The computer program instructions also cause the GPU to perform: generating particles of the target particle system according to the general attribute information of the target particle system, and initializing particle attributes of the particles of the target particle system. The particle attributes of each particle includes position information, velocity information, a life cycle and a generation time of the particle. The computer program instructions also cause the GPU to perform: displaying the particles of the target particle system according to the particle attributes of the particles in the target particle system.

Details of one or more embodiments of the present disclosure are provided in the following accompanying drawings and descriptions. Other features, objectives, and advantages of the present disclosure become clear in the specification, the accompanying drawings, and the claims.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the present disclosure in detail with reference to the accompanying drawings.

As disclosed herein, method, apparatus, and storage medium for processing a particle system according to various embodiments of the present disclosure may be implemented by using a graphics processing unit (GPU) in a computer system, or may be implemented by using a functional architecture that has a function similar to that of a GPU and that is in a computer system. Schematically, the following describes implementations of the present disclosure by using the GPU as an execution object in the embodiments of the present disclosure. In a functional architecture of a computer system of another embodiment, corresponding steps in the embodiments of the present disclosure may alternatively be implemented by other functional structures.

Figure 1:
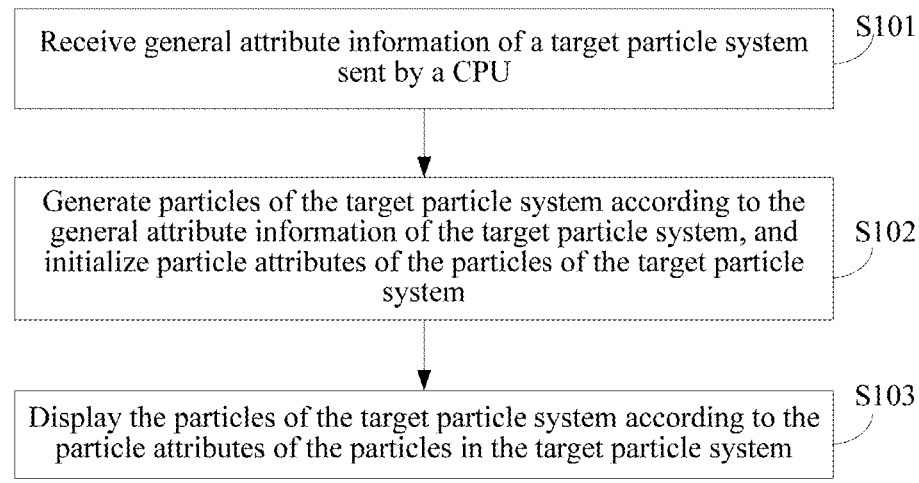
FIG. 1 is a schematic flowchart of a processing method for a particle system according to an embodiment of the present disclosure.

FIG. 1 is a schematic flowchart of a processing method for a particle system according to an embodiment of the present disclosure. As shown in the figure, the method includes at least the following steps:

S101: Receiving general attribute information of a target particle system sent by a central processing unit (CPU).

For example, the particle system in one embodiment of the present disclosure is a graphic display unit, and is used to effectively simulate an irregular fuzzy object or shape. For example, a particle system is used to simulate and display a firework on a screen, and another particle system is used to simulate and display a series of characters having an ever changing state on the screen. The target particle system is a system configured to render target. In the particle system, the irregular object is defined as including a large quantity of irregular particles that are randomly distributed, and each particle has a life cycle. The particles constantly change their positions and move, fully presenting properties of the irregular object. In one embodiment of the present disclosure, the CPU transmits general attribute data of the particle system to a GPU. The general attribute data includes value ranges of attributes of all particles in the particle system, and does not need include attributes of a single particle. The transmitted data cannot increase as the quantity of particles increases. The general attribute information of the particle system includes a particle display range (a shader emitting position and range), a particle life cycle range, a particle velocity range, and a generation time. In one embodiment, the CPU may transmit the general attribute information of the target particle system to a constant register of the GPU.

In some embodiments, the general attribute information may further include key frame data of the target particle system, or may include pattern information of the target particle system. The information is used for initializing particle attributes of the particles of the particle system, or used for subsequently updating particle attributes of the particles of the target particle system. The key frame data of the target particle system includes a displayed objectposition of displayed object, a rate of change or a displayed color at corresponding time of at least one key frame. The pattern information of the target particle system carries initial pixel position information and a generation time of each pixel.

In some embodiments, the CPU may periodically send the general attribute information of the target particle system to the GPU, where the general attribute information is used by the GPU for subsequently updating the particle attributes of the particles of the target particle system.

S102: Generating particles of the target particle system according to the general attribute information of the target particle system, and initializing particle attributes of the particles of the target particle system. The particle attributes of each particle include position information, velocity information, a life cycle and a generation time of the particle.

For example, the GPU may randomly determine the position information of the particles in the particle display range according to the particle display range (for determining shader emitting position and range) in the general attribute information of the target particle system, that is, positions of the generated particles are randomly distributed in the particle display range; the GPU may randomly determine the life cycle of each particle in the particle life cycle range according to the particle life cycle range in the general attribute information of the target particle system, that is, the life cycles of the generated particles are randomly distributed in the particle life cycle range; the GPU may randomly determine a velocity of each particle in the particle velocity range according to the particle velocity range of the target particle system, that is, the velocities of the generated particles are randomly distributed in the particle velocity range; and the GPU may randomly determine the generation time of each particle in a determined life cycle of the generation time according to the generation time in the general attribute information of the target particle system, that is, the generation time of the generated particles is randomly distributed in the determined life cycle of the generation time.

In some embodiments, the GPU may save the position information and the generation time of the generated particles in a position render target (PosRT or position RT, where RT is Render target and indicates off-screen render texture), where an RGB channel of the PosRT records the position information of the particles, and an alpha channel of the PosRT records the generation time of the particles; and save the velocity information and the life cycle of the generated particles in a velocity render target (VelocityRT), where an RGB channel of the VelocityRT records the velocity information of the particles, and an alpha channel of the VelocityRT records the life cycle of the particles. In some embodiments, GPU may add the particle attributes of the particles to the position render target and the velocity render target by using a shader configured to generate the particles. In some embodiments, each RT (the PosRT or the VelocityRT) may be in a format of RGBA32f. An occupied video memory is 0.125 M to 16 M, and correspondingly, particle attributes of 8192 to 100 W particles can be stored.

In some embodiments, when the general attribute information of the target particle system carries the key frame data of the target particle system, the GPU may initialize the particle attributes of the particles of the target particle system according to the key frame data of the target particle system. The key frame data of the target particle system may include an initial display position, an initial rate of change, or an initial displayed color. For example, when the key frame data of the target particle system includes a displayed objectposition of displayed object of an initial key frame, the GPU may determine the position information of the target particle system according to the displayed objectposition of displayed object of the initial key frame. Compared with determining the position information of the target particle system according to the particle display range in the general attribute information, a display position of each particle of the particle system may be further determined precisely according to the displayed objectposition of displayed object of the initial key frame, and may not be limited by a shape of a display range of the shader. Similarly, the GPU may further determine initial velocity information and a displayed color of each particle of the particle system according to a rate of change of the initial key frame.

S103: Displaying the particles of the target particle system according to the particle attributes of the particles in the target particle system.

For example, the GPU may sample the position information saved in the position render target (PosRT) and the velocity information saved in the velocity render target (VelocityRT) of a particle, then draw a corresponding particle on a screen according to the position information and the velocity information of the particle, where the position information of the particle determines a drawing position of the particle on the screen, and the velocity information may determine a posture and direction in which the particle is displayed and be used for subsequent updating.

The GPU may display the particles by using the shader for displaying the particles. The shader for displaying the particles is for example configured to: read the position information of the particle from the position render target, and read the velocity information of the particle from the velocity render target, and draw the corresponding particle on the screen according to the position information and the velocity information of the particle. The shader is an editable program that is used to implement image rendering on the GPU and that is used to replace a fixed rendering pipeline. The shader includes a vertex shader and a pixel shader. The vertex shader is used for an operation of a geometrical relationship of a vertex and the like, the pixel shader is used for calculating a color of a program source and the like. Due to the editability of the shader, the corresponding particle is displayed by sampling a render target (RT) in the vertex shader and sampling a color in the pixel shader, so that various image effects can be implemented without being limited by the fixed rendering pipeline of a graphics card.

Figure 2:
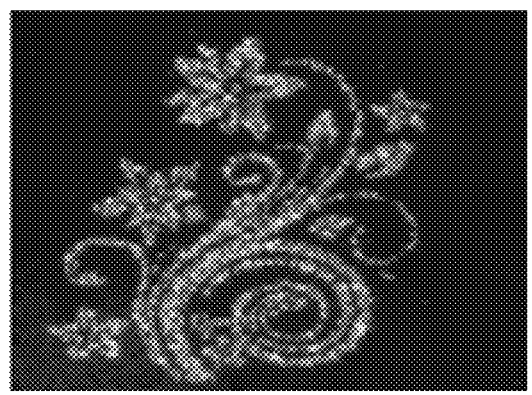
FIG. 2 is a schematic diagram of a pattern effect displayed by a particle system according to an embodiment of the present disclosure.
Figure 3:
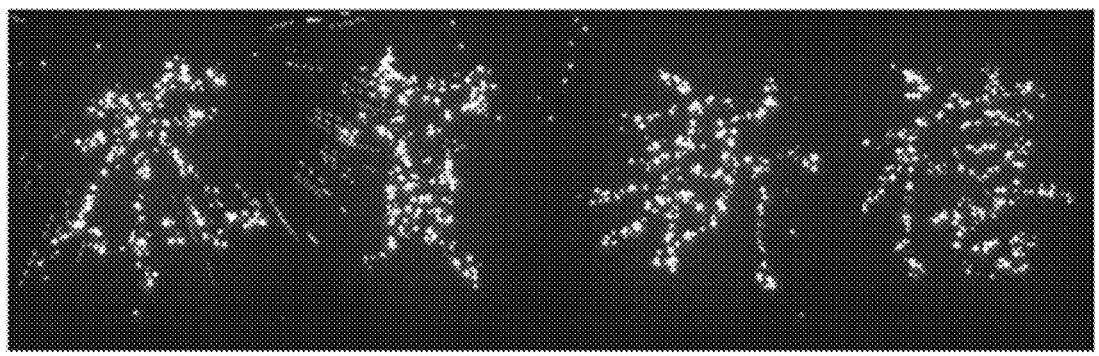
FIG. 3 is a schematic diagram of a text effect displayed by a particle system according to an embodiment of the present disclosure.

Exemplarily, FIG. 2 shows a pattern effect displayed by using the shader, and FIG. 3 is a text effect displayed by using the shader. The pattern effect and the text effect may be black and white, or colorful.

Figure 4:
FIG. 4 is a schematic diagram of a display effect of a particle system in combination with a specific game scenario according to an embodiment of the present disclosure.

In combination with a specific game scenario, a display effect of the target particle system of the present disclosure may be shown in FIG. 4. In some embodiments, the particles of the target particle system may be displayed on the top layer of the game scenario. That is, other displayed objects in a game scenario interface are first drawn, and finally the target particle system is displayed on the screen.

In some embodiments, the shader may display the particles in a radiation manner, or in an aggregation manner. The radiation manner is to randomly radiate the particles all around at a random speed and centered on the emitting position of the shader. In this case, an aggregation degree of the particles in an initial state is the highest, and the particles gradually diffuse. The aggregation manner is also called an attraction manner. That is, the shader randomly emits the particles within a range, and then an attraction is set on a preset track or pattern of the screen, so that surrounding particles may be dragged around the track or pattern. In this case, an aggregation degree of the particles in an initial state is very low, and then the particles gradually aggregate around the preset track or pattern, forming a display effect of the preset track or pattern.

According to one embodiment of the present disclosure, the GPU generates and displays particles after receiving general attribute information of the particle system sent by the CPU. According to one embodiment of the present disclosure, data transmission between the GPU and the CPU is greatly reduced, and times and a frequency of the GPU of waiting for data transmission of the CPU are reduced, thereby improving the processing efficiency of the particle system.

Figure 5:
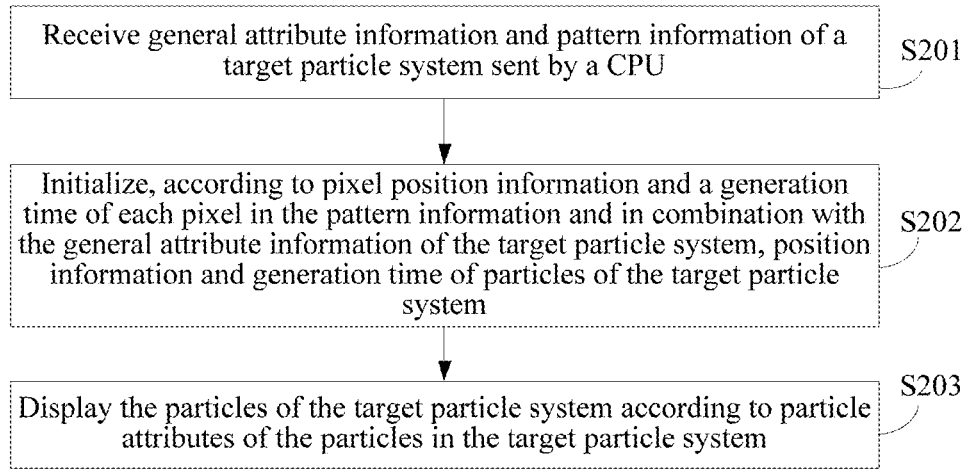
FIG. 5 is a schematic flowchart of a processing method for a particle system according to another embodiment of the present disclosure.

FIG. 5 is a schematic flowchart of a processing method for a particle system according to another embodiment of the present disclosure. As shown in the figure, the method includes at least the following steps:

S201: Receiving general attribute information and pattern information of a target particle system sent by a CPU.

The general attribute information of the particle system includes a particle display range (a shader emitting position and range), a particle life cycle range, a particle velocity range, and a generation time. In some embodiments, the CPU may transmit the general attribute information of the target particle system to a constant register of a GPU.

The pattern information of the target particle system may include position information of each pixel and a generation time of each pixel. In some embodiments, the CPU may add the pattern information (for example, a color image) of the target particle system to a specified storage space, for example, in a memory, a hard disk or a video memory, and the GPU loads the pattern information from the specified storage space.

For example, the CPU may generate a color image according to a B/W image. Pixels in the B/W image are traversed one by one. When a pixel color is greater than 0 (non-black), an RGB channel of a pixel in the color image is used to record position information of the pixel whose color is greater than 0, and an alpha channel of the pixel is used to record information of the pixel whose color is greater than 0, for example, a generation time and a display time, so that the position and time information of each pixel whose color is greater than 0 is saved in each pixel of the color image. The CPU sends the obtained pattern information of the color image to the GPU.

Figure 12:
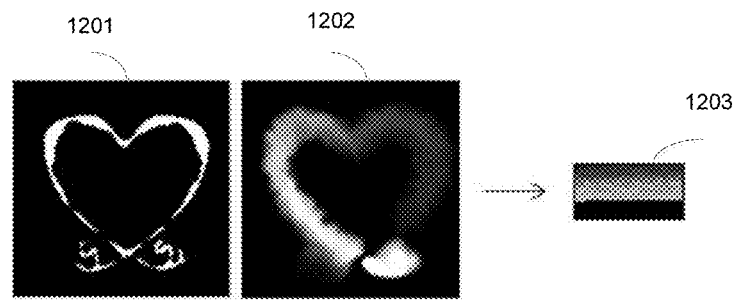
FIG. 12 is a schematic diagram of a color image that is generated by a CPU according to a B/W digital image and that is sent to a GPU according to an embodiment of the present disclosure.

Exemplarily, as shown in a B/W image of FIG. 12, an RGB channel of the B/W image is presented on a left side, and an alpha channel of the B/W image is presented on a right side. The CPU may generate and obtain a color image on a right side according to position information in the RGB channel of the B/W image and time information in the alpha channel of the B/W image. Colors of pixels in the color image are determined according to positions of non-zero pixels of the B/W image. An alpha channel of each pixel records information of a pixel whose color is greater than 0, for example, a generation time and a display time.

In some embodiments, the B/W image may be an image having a text pattern.

Similarly, the CPU may alternatively generate the color image according to a three-dimensional model image (3D grid image). Similarly, an RGB channel of a pixel of the color image stores position coordinates of a vertex in the three-dimensional model image.

For example, a B/W image based on which the CPU generates a color pattern may be a text pattern. Because the resolution (default 32*32) of an image generated based on the text pattern is very low, the image may be generated in real time.

S202: Initializing, according to pixel position information and a generation time of each pixel in the pattern information and in combination with the general attribute information of the target particle system, position information and generation time of particles of the target particle system.

The GPU extracts corresponding pixel position information and generation time of pixels from the pattern information, to initialize particle attributes of the particles of the target particle system according to a position and the generation time of each pixel in combination with the general attribute information of the target particle system.

S203: Displaying the particles of the target particle system according to particle attributes of the particles in the target particle system.

Therefore, the GPU may restore an original image corresponding to the pattern information on the screen, for example, the foregoing target B/W image or three-dimensional model image.

According to one embodiment, the GPU may receive general attribute information and pattern information of the target particle system sent by the CPU, to generate and display particles according to the general attribute information and the pattern information of the target particle system, thereby further determining display positions and generation time of the particles of the particle system according to pixel position information and generation time of pixels that are extracted from the pattern information, to implement more elaborate particle display control.

Figure 6:
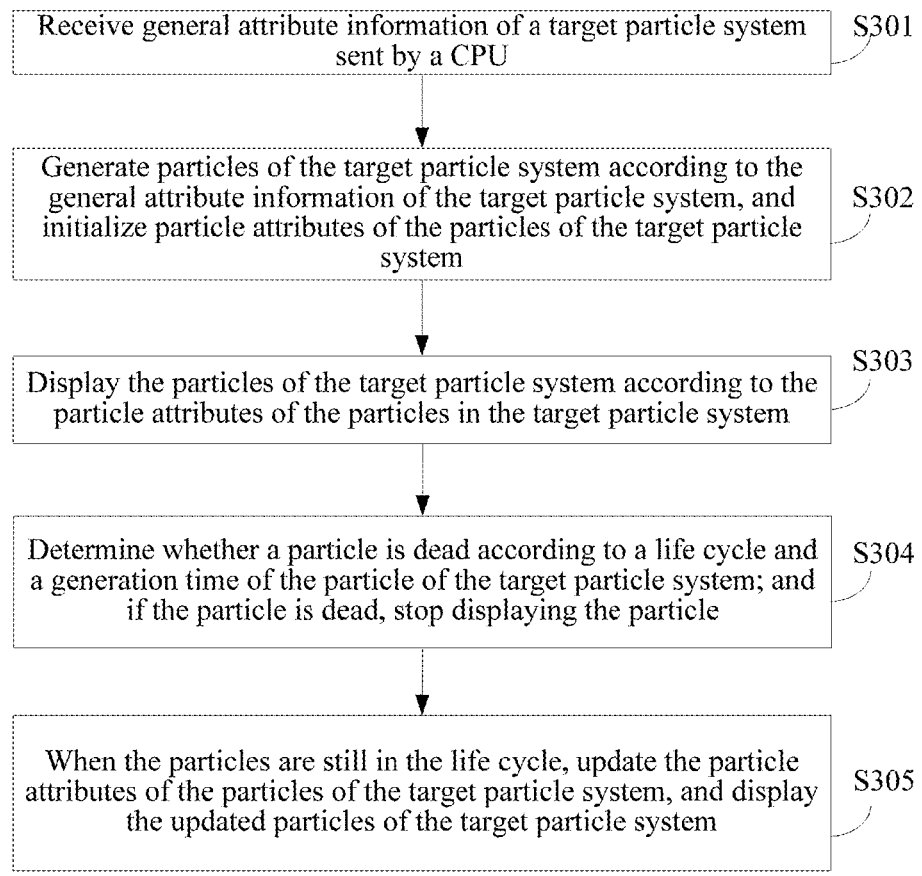
FIG. 6 is a schematic flowchart of a processing method for a particle system according to another embodiment of the present disclosure.

FIG. 6 is a schematic flowchart of a processing method for a particle system according to another embodiment of the present disclosure. As shown in the figure, the method includes at least the following steps:

S301: Receiving general attribute information of a target particle system sent by a CPU.

The general attribute information of the particle system includes a particle display range (a shader emitting position and range), a particle life cycle range, a particle velocity range, and a generation time. In some embodiments, the CPU may transmit the general attribute information of the target particle system to a constant register of a GPU.

In some embodiments, the general attribute information may further include key frame data of the target particle system, or may include pattern information of the target particle system and a force-bearing state of the target particle system, which is used for initializing particle attributes of particles of the particle system, or used for subsequently updating particle attributes of particles of the target particle system. The key frame data of the target particle system includes a displayed object position of displayed object, a rate of change or a displayed color at corresponding time of at least one key frame. The pattern information of the target particle system carries initial pixel position information and a generation time of each pixel.

In some embodiments, the CPU may periodically send the general attribute information of the target particle system to the GPU, where the general attribute information is used by the GPU for subsequently updating the particle attributes of the particles of the target particle system.

S302: Generating particles of the target particle system according to the general attribute information of the target particle system, and initializing particle attributes of the particles of the target particle system. The particle attributes of each particle include position information, velocity information, a life cycle and a generation time of the particle.

Refer to S102 in the foregoing embodiment for specific implementation, and details are not described again in one embodiment.

S303: Displaying the particles of the target particle system according to the particle attributes of the particles in the target particle system.

Refer to S103 in the foregoing embodiment for specific implementation, and details are not described again in one embodiment.

S304: Determining whether a particle is dead according to the life cycle and the generation time of the particle of the target particle system; and when the particle is dead, stoping displaying the particle.

For example, in one embodiment, the GPU records the generation time and the life cycle of each particle when initializing the particle attributes of the particles, for example, records the generation time and the life cycle of each particle by using alpha channels of a PosRT and a VelocityRT; after the particles are displayed by using a shader, a generation time length of each particle may be obtained according to the generation time of the particle and a current time, and then the generation time length is compared with the life cycle of the particle; and when the generation time length reaches or exceeds the life cycle, it may be determined that the particle is dead, then the dead particle is moved out of a screen, and displaying of the particle is stopped.

S305: when the particles are still in the life cycle, updating the particle attributes of the particles of the target particle system, and displaying the updated particles of the target particle system by using a shader.

For example, the particle attributes may be divided into particle attributes related to the force-bearing state and particle attributes unrelated to the state. The particle attribute unrelated to the state is a particle attribute calculated by using a closure function that is defined only according to original attributes of a particle and a current time. However, the particle attribute related to the state means that particle attributes of a previous frame need to be read as inputs for updating calculation. The particle attribute related to the state needs an independent drawing step. The updated particle attribute is saved in an RT, and an updated particle is displayed by using the shader. In some embodiments, the GPU does not need to update the particles in each frame, and may set an updating cycle of the particles as needed. For example, an updating cycle of particles for simulating and describing an object distant from a visual angle may be once every two frames or once every three times.

In some embodiments, the GPU may update the particle attributes related to the state according to the force-bearing state of the target particle system. The force-bearing state of the target particle system may be processed by the CPU and then be transmitted to the GPU. For example, while periodically sending general information of the target particle system to the GPU, the CPU also sends the force-bearing state of the target particle system to the GPU.

In some embodiments, the GPU may alternatively update the particle attributes of the particles of the target particle system according to key frame data of the target particle system. The key frame data of the target particle system includes a displayed objectposition of displayed object, a rate of change, or a displayed color at corresponding time of at least one key frame. When the corresponding time of the key frame is reached, the GPU may determine the position information of the target particle system according to the displayed objectposition of displayed object at the corresponding time of the key frame, may adjust positions of the particles to the displayed objectposition of displayed object displayed in the key frame, and similarly, may adjust the velocity information of the target particle system in a unified manner according to the rate of change at the corresponding time of the key frame and may adjust colors of the particles of the target particle system in a unified manner according to a color of a displayed object at the corresponding time of the key frame, thereby implementing precise control over the particles of the target particle system.

According to one embodiment of the present disclosure, the GPU generates particles after receiving general attribute information of a particle system sent by the CPU, and displays the generated particles and manages a life cycle. According to one embodiment of the present disclosure, data transmission between the GPU and the CPU is greatly reduced, and times and a frequency of the GPU of waiting for data transmission of the CPU are reduced, thereby improving the processing efficiency of the particle system.

Figure 7:
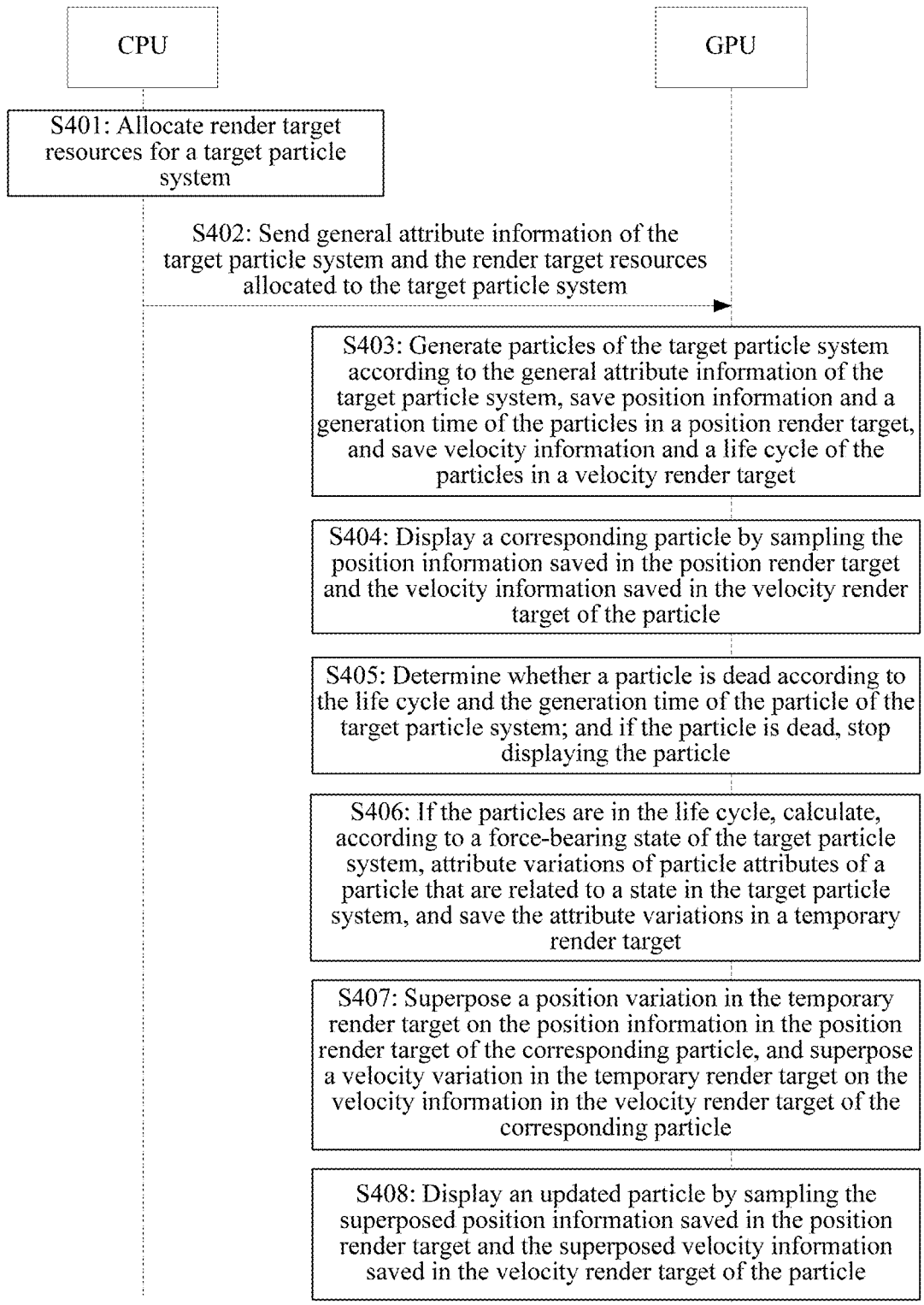
FIG. 7 is a schematic flowchart of a processing method for a particle system according to another embodiment of the present disclosure.

FIG. 7 is a schematic flowchart of a processing method for a particle system according to another embodiment of the present disclosure. As shown in the figure, the method includes at least the following steps:

S401: A CPU allocates render target resources for a target particle system.

In some embodiments, the render target resources (RT resources) are video memory resources allocated to the target particle system. For example, the CPU allocates the render target resources for the target particle system according to a maximum quantity of particles that exist in the target particle system at the same time, where the maximum quantity of particle=a maximum particle emissivity*a maximum life cycle. Then, the RT resources required by the target particle system may be determined according to the quantity of particles and/or particle attributes stored in each RT resource. For example, in some embodiments, each RT (a PosRT or a VelocityRT) is in a format of RGBA32f. An occupied video memory is 0.125 M to 16 M, and correspondingly, particle attributes of 8192 to 100 W particles can be stored.

Then, to reduce fragments generated by the allocation and recovery, a multi-order linked list may be established to manage idle render target resources, and then the render target resources are allocated for the target particle system from the idle render target resources according to a buddy algorithm. For example, as shown in FIG. 9, 0 to 9 identify orders of an order linked list. A management size of an n-order linked list includes 1*2n RT resources. That is, the size of RT blocks managed by each order linked list is double of that of RT blocks managed by an upper order. However, in the n-order linked list, the RT resources may further be divided into a plurality of subblocks. For example, 1*2n RT resources may be divided into 2*2n−1 RT resources. When the order linked list is used to manage the allocation, when the target particle system requires four RTs, checking is started from the order linked list whose block size is 4. When there is an idle block in the linked list, an RT resource block whose size is 4 may be directly allocated to a user, otherwise checking is performed on a lower order (the block size is 8) linked list; when there is an idle resource block in the linked list whose size of managed RT resource blocks is 8, the idle RT resource block is split into two resource blocks whose size is 4, where one RT resource block whose size is 4 is allocated to the target particle system, and the other resource block whose size is 4 is added to the upper order linked list, and so on. However, when the target particle system releases the RT resources, when currently there is an idle RT resource block whose size is the same as that of an RT resource block released by the target particle system, the two RT resource blocks having the same size are combined and placed in a lower order linked list. For example, when the target particle system releases an RT resource block whose size is 4, and when an idle RT resource block whose size is 4 is found, the two RT resource blocks may be combined into an RT resource block whose size is 8, and the combined RT resource block is placed in a linked list whose size of managed RT resource blocks is 8, and so on.

S402: Receiving general attribute information of the target particle system sent by the CPU and the render target resources allocated to the target particle system.

For example, the particle system in one embodiment of the present disclosure is an effective graphic display unit for simulating an irregular fuzzy object or a shape. For example, a particle system is used to simulate and display a firework on a screen, and another particle system is used to simulate and display a series of characters having an ever changing state on the screen. In the particle system, the irregular object is defined as including a large quantity of irregular particles that are randomly distributed, and each particle has a life cycle. The particles constantly change their positions and constantly move, fully presenting properties of the irregular object. The general attribute information of the particle system includes a particle display range (a shader emitting range), a particle life cycle range, a particle velocity range, and a generation time.

The CPU transmits data of general attributes of the particle system to a GPU, and the data does not need to include attributes of a single particle. The transmitted data cannot increase as the quantity of particles increases.

In some embodiments, the CPU may alternatively place a maximum particle emissivity and a maximum life cycle of the target particle system into the general attribute information of the target particle system and send the information to the GPU. The GPU allocates the render target resources for the target particle system.

S403: Generating particles of the target particle system according to the general attribute information of the target particle system, saving position information and a generation time of the particles in a position render target, and saving velocity information and a life cycle of the particles in a velocity render target.

For example, particle attributes of each particle include position information, velocity information, a life cycle and a generation time of the particle.

The GPU may save the position information and the generation time of the generated particles in the position render target (PosRT), where an RGB channel of the PosRT records the position information of the particles, and an alpha channel of the PosRT records the generation time of the particles; and save the velocity information and the life cycle of the generated particles in the velocity render target (VelocityRT), where an RGB channel of the VelocityRT records the velocity information of the particles, and an alpha channel of the VelocityRT records the life cycle of the particles.

S404: Displaying a corresponding particle by sampling the position information saved in the position render target and the velocity information saved in the velocity render target of the particle.

For example, the GPU may sample the position information saved in the position render target (PosRT) and the velocity information saved in the velocity render target (VelocityRT) of the particle, then draw the corresponding particle on a screen according to the position information and the velocity information of the particle, where the position information of the particle determines a drawing position of the particle on the screen, and the velocity information may determine a posture and direction in which the particle is displayed and be used for subsequent updating.

The GPU may display the particles by using the shader for displaying the particles. The shader for displaying the particles is for example configured to: read the position information of the particle from the position render target, and read the velocity information of the particle from the velocity render target, and draw the corresponding particle on the screen according to the position information and the velocity information of the particle. The shader is an editable program that is used to implement image rendering on the GPU and that is used to replace a fixed rendering pipeline. The shader includes a vertex shader and a pixel shader. The vertex shader is used for an operation of a geometrical relationship of a vertex and the like, the pixel shader is used for calculating a color of a program source and the like. Due to the editability of the shader, the corresponding particle is displayed by sampling a render target RT in the vertex shader and sampling a color in the pixel shader, so that various image effects can be implemented without being limited by the fixed rendering pipeline of a graphics card.

For example, FIG. 2 shows a pattern effect displayed by using the shader, and FIG. 3 is a text effect displayed by using the shader. The pattern effect and the text effect may be black and white or colorful.

S405: Determining whether a particle is dead according to the life cycle and the generation time of the particle of the target particle system; and when the particle is dead, stoping displaying the particle.

For example, the generation time and the life cycle of the particles are recorded in the alpha channels of the PosRT and the VelocityRT. A generation time length is obtained according to the generation time of each particle and a current time, and then the generation time length is compared with the life cycle of the particle. When the generation time length reaches or exceeds the life cycle, it may be determined that the particle is dead, then the dead particle is moved out of the screen, and displaying of the particle is stopped.

S406: when the particles are in the life cycle, calculating, according to a force-bearing state of the target particle system, attribute variations of particle attributes of a particle that are related to the force-bearing state in the target particle system, and saving the attribute variations in a temporary render target.

For example, the particle attributes may be divided into particle attributes related to the force-bearing state and particle attributes unrelated to the state. The particle attribute unrelated to the state is a particle attribute calculated by using a closure function that is defined only according to original attributes of a particle and a current time. However, the particle attribute related to the state means that particle attributes of a previous frame need to be read as inputs for updating calculation. Updating of the particle attribute related to the state needs an independent drawing step, and the particle attribute is rendered to an RT. when the particles are in the life cycle, the GPU may calculate, according to the force-bearing state of the target particle system, the attribute variations of the particle attributes of the particle that are related to the state in the target particle system, and save the attribute variations in the temporary render target, where the attribute variations include a position variation and a velocity variation. In some embodiments, the CPU may transmit, to the GPU, the force-bearing state of the target particle system that is obtained after processing. For example, while periodically sending general information of the target particle system to the GPU, the CPU also sends the force-bearing state of the target particle system to the GPU.

S407: Superposing a position variation in the temporary render target on the position information in the position render target of the corresponding particle, and superposing a velocity variation in the temporary render target on the velocity information in the velocity render target of the corresponding particle.

For example, when the position information saved in the position render target before updating is u1, and a position increment obtained by means of calculation is u, the position information saved in the position render target after the updating is u2=u1+u; similarly, when the velocity information saved in the velocity render target before the updating is v1, and a velocity increment obtained by means of calculation is v, the velocity information saved in the velocity render target after the updating is v2=v1+v, where u and v are saved by using the temporary render target.

Figure 8:
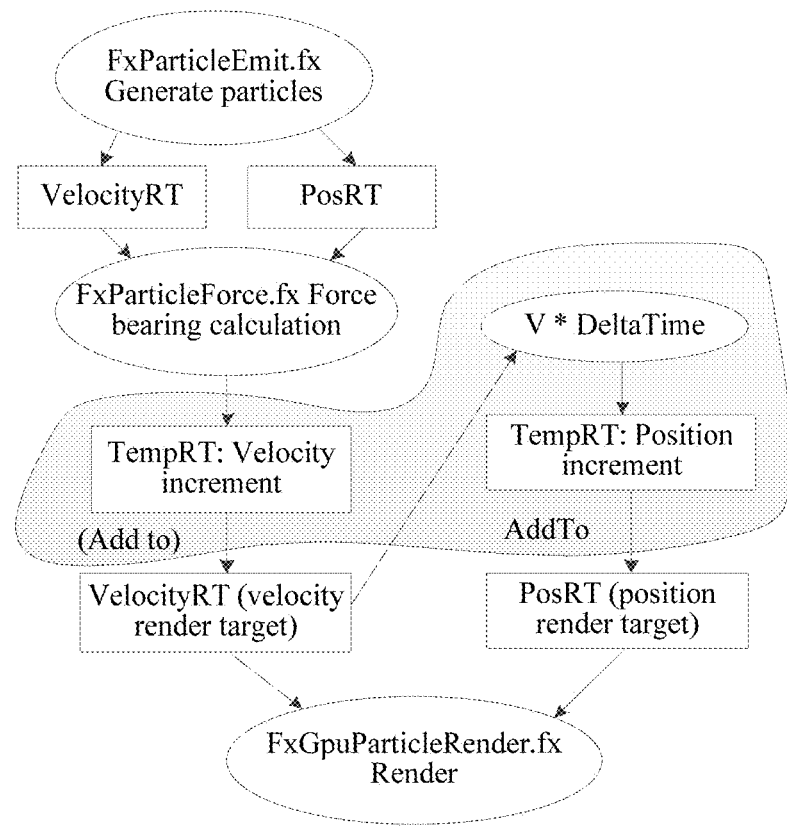
FIG. 8 is a schematic structural diagram of a buddy algorithm according to an embodiment of the present disclosure.
Figure 9:
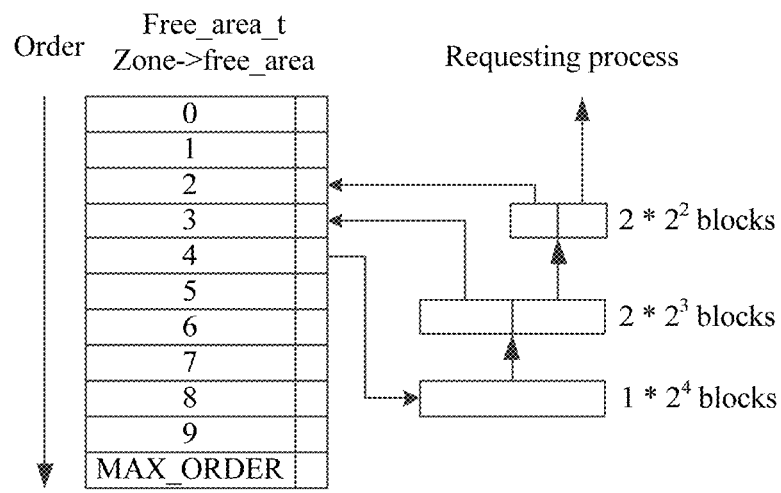
FIG. 9 is a schematic diagram of an allocation interface of a particle system according to an embodiment of the present disclosure.

Referring to FIG. 8 for an exemplary updating processing procedure, the gray area is a core of an algorithm for reducing RTs. A TempRT saves an increment and does not read a result saved in a previous frame, and the TempRT may be released after updating. Compared with a classic algorithm, at least two RTs are reduced, and at least two processes of add to Pass are added.

S408: Displaying an updated particle by sampling the superposed position information saved in the position render target (PosRT) and the superposed velocity information saved in the velocity render target (VelocityRT) of the particle.

According to one embodiment of the present disclosure, the GPU generates particles after receiving general attribute information of a particle system sent by the CPU, and displays the generated particles and manages a life cycle. According to one embodiment of the present disclosure, data transmission between the GPU and the CPU is greatly reduced, and times and a frequency of the GPU of waiting for data transmission of the CPU are reduced, thereby improving the processing efficiency of the particle system. On the other hand, when updating particle attributes, the CPU usually needs two or more pairs of RTs to save position information and velocity information of particles in a current frame and in a previous frame. However, in one embodiment of the present disclosure, when updating particle attributes, the GPU only needs to save increments of velocity information and position information. Therefore, at least one position render target and one velocity render target may be reduced, and only a temporary render target needs to be added. However, the temporary render target may be released after the updating. Especially in a processing process of the particle system having a huge quantity of particles, a large quantity of video memory resources may be reduced.

Figure 10:
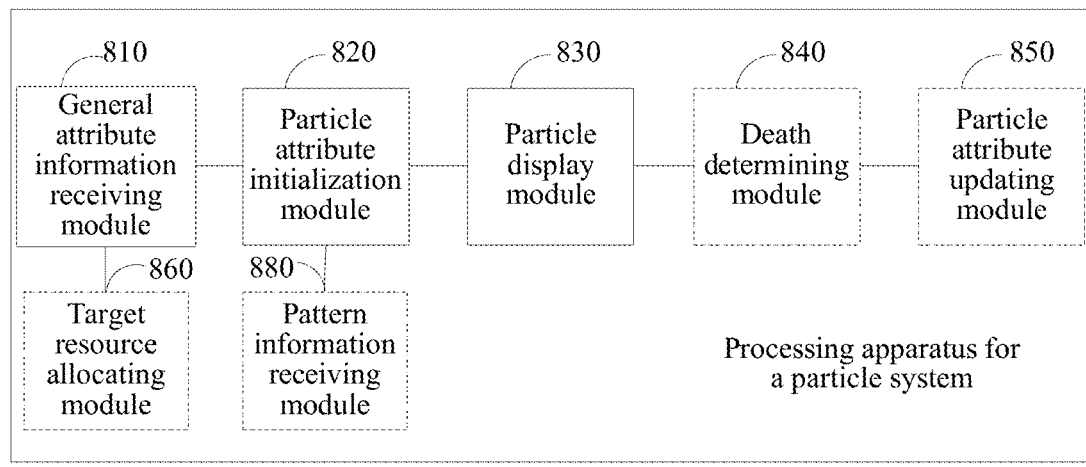
FIG. 10 is a schematic structural diagram of a processing apparatus for a particle system according to an embodiment of the present disclosure.

FIG. 10 is a schematic structural diagram of a processing apparatus for a particle system according to an embodiment of the present disclosure. As shown in FIG. 10, the apparatus includes at least a general attribute information receiving module 810, a particle attribute initialization module 820, and a particle display module 830.

The general attribute information receiving module 810 is configured to receive general attribute information of a target particle system sent by a CPU.

For example, the particle system in one embodiment of the present disclosure is a graphic display unit, and is used to effectively simulate an irregular fuzzy object or shape. For example, a particle system is used to simulate and display a firework on a screen, and another particle system is used to simulate and display a series of characters having an ever changing state on the screen. In the particle system, the irregular object is defined as including a large quantity of irregular particles that are randomly distributed, and each particle has a life cycle. The particles constantly change their positions and move, fully presenting properties of the irregular object. In one embodiment of the present disclosure, the CPU transmits data of general attributes of the particle system to a GPU, and the data does not need to include attributes of a single particle. The transmitted data cannot increase as the quantity of particles increases. The general attribute information of the particle system includes a particle display range (a shader emitting position and range), a particle life cycle range, a particle velocity range, and a generation time. In some embodiments, the CPU may transmit the general attribute information of the target particle system to a constant register of a GPU.

In some embodiments, the general attribute information may further include key frame data of the target particle system, or may include pattern information of the target particle system. The information is used for initializing particle attributes of the particles of the particle system, or used for subsequently updating particle attributes of the particles of the target particle system. The key frame data of the target particle system includes a displayed object, a position of displayed object, a rate of change or a displayed color at a corresponding time of at least one key frame. The pattern information of the target particle system carries initial pixel position information and a generation time of each pixel.

In some embodiments, the CPU may periodically send the general attribute information of the target particle system to the GPU, where the general attribute information is used by the GPU for subsequently updating the particle attributes of the particles of the target particle system.

The particle attribute initialization module 820 is configured to: generate particles of the target particle system according to the general attribute information of the target particle system, and initialize particle attributes of the particles of the target particle system.

For example, the particle attribute initialization module 820 may randomly determine the position information of the particles in the particle display range according to the particle display range (for determining shader emitting position and range) in the general attribute information of the target particle system, that is, positions of the generated particles are randomly distributed in the particle display range; the GPU may randomly determine the life cycle of each particle in the particle life cycle range according to the particle life cycle range in the general attribute information of the target particle system, that is, the life cycles of the generated particles are randomly distributed in the particle life cycle range; the GPU may randomly determine a velocity of each particle in the particle velocity range according to the particle velocity range of the target particle system, that is, the velocities of the generated particles are randomly distributed in the particle velocity range; and the GPU may randomly determine the generation time of each particle in a determined life cycle of the generation time according to the generation time in the general attribute information of the target particle system, that is, the generation time of the generated particles is randomly distributed in the determined life cycle of the generation time.

In some embodiments, the particle attribute initialization module 820 is for example configured to:

save the position information and the generation time of the particles in a position render target, and save the velocity information and the life cycle of the particles in a velocity render target. The particle attribute initialization module 820 may save the position information and the generation time of the generated particles in a position render target (PosRT or position RT, where RT is Render Target and indicates off-screen render texture), where an RGB channel of the PosRT records the position information of the particles, and an alpha channel of the PosRT records the generation time of the particles; and save the velocity information and the life cycle of the generated particles in a velocity render target (VelocityRT), where an RGB channel of the VelocityRT records the velocity information of the particles, and an alpha channel of the VelocityRT records the life cycle of the particles. In some embodiments, the particle attribute initialization module 820 may add the particle attributes of the particles to the position render target and the velocity render target by using a shader configured to generate the particles.

In some embodiments, each RT (the PosRT or the VelocityRT) may be in a format of RGBA32f. An occupied video memory is 0.125 M to 16 M, and correspondingly, particle attributes of 8192 to 100 W particles can be stored.

In some embodiments, when the general attribute information of the target particle system carries the key frame data of the target particle system, the GPU may initialize the particle attributes of the particles of the target particle system according to the key frame data of the target particle system. The key frame data of the target particle system may include an initial display position, an initial rate of change, or an initial displayed color. For example, when the key frame data of the target particle system includes a position of displayed object of an initial key frame, the GPU may determine the position information of the target particle system according to the position of displayed object of the initial key frame. Compared with determining the position information of the target particle system according to the particle display range in the general attribute information, a display position of each particle of the particle system may be further determined precisely according to the position of displayed object of the initial key frame, and may not be limited by a shape of a display range of the shader. Similarly, the GPU may further determine initial velocity information and a displayed color of each particle of the particle system according to a rate of change of the initial key frame.

The particle display module 830 is configured to display the particles of the target particle system by using a shader according to the particle attributes of the particles in the target particle system.

For example, the particle display module 830 may sample the position information saved in the position render target (PosRT) and the velocity information saved in the velocity render target (VelocityRT) of the particle, then draw the corresponding particle on a screen according to the position information and the velocity information of the particle, where the position information of the particle determines a drawing position of the particle on the screen, and the velocity information may determine a posture and direction in which the particle is displayed and be used for subsequent updating.

The particle display module 830 may display the particles by using the shader for displaying the particles. The shader for displaying the particles is for example configured to: read the position information of the particle from the position render target, and read the velocity information of the particle from the velocity render target, and draw the corresponding particle on the screen according to the position information and the velocity information of the particle. The shader is an editable program that is used to implement image rendering on the GPU and that is used to replace a fixed rendering pipeline. The shader includes a vertex shader and a pixel shader. The vertex shader is used for an operation of a geometrical relationship of a vertex and the like, the pixel shader is used for calculating a color of a program source and the like. Due to the editability of the shader, the corresponding particle is displayed by sampling a render target RT in the vertex shader and sampling a color in the pixel shader, so that various image effects can be implemented without being limited by the fixed rendering pipeline of a graphics card.

Exemplarily, FIG. 2 shows a pattern effect displayed by using the shader, and FIG. 3 is a text effect displayed by using the shader. The pattern effect and the text effect may be black and white or colorful.

In combination with a specific game scenario, a display effect of the target particle system of the present disclosure may be shown in FIG. 4. In some embodiments, the particles of the target particle system may be displayed on the top layer of the game scenario. That is, other displayed objects in a game scenario interface are first drawn, and finally the target particle system is displayed on the screen.

In some embodiments, the shader may display the particles in a radiation manner, or in an aggregation manner. The radiation manner is to randomly radiate the particles all around at a random speed and centered on the emitting position of the shader. In this case, an aggregation degree of the particles in an initial state is the highest, and the particles gradually diffuse. The aggregation manner is also called an attraction manner. That is, the shader randomly emits the particles within a range, and then an attraction is set on a preset track or pattern of the screen, so that surrounding particles may be dragged around the track or pattern. In this case, an aggregation degree of the particles in an initial state is very low, and then the particles gradually aggregate around the preset track or pattern, forming a display effect of the preset track or pattern.

In some embodiments, the apparatus may further include a death determining module 840, configured to: determine whether a particle is dead according to the life cycle and the generation time of the particle of the target particle system, and when the particle is dead, stop displaying the particle.

For example, the GPU records the generation time and the life cycle of each particle when initializing the particle attributes of the particles, for example, records the generation time and the life cycle of each particle by using alpha channels of a PosRT and a VelocityRT; after the particles are displayed by using a shader, the death determining module 840 may obtain a generation time length of each particle according to the generation time of the particle and a current time, thereby comparing the generation time length with the life cycle of the particle; and when the generation time length reaches or exceeds the life cycle, the death determining module 840 may determine that the particle is dead, then move the dead particle out of a screen, and stop displaying the particle.

In some embodiments, the apparatus may further include a particle attribute updating module 850, configured to: when the particles are still in the life cycle, update the particle attributes of the particles of the target particle system, and display the updated particles of the target particle system.

For example, the particle attributes may be divided into particle attributes related to the force-bearing state and particle attributes unrelated to the state. The particle attribute unrelated to the state is a particle attribute calculated by using a closure function that is defined only according to original attributes of a particle and a current time. However, the particle attribute related to the state means that particle attributes of a previous frame need to be read as inputs for updating calculation. The particle attribute related to the state needs an independent drawing step. The updated particle attribute is saved in an RT, and an updated particle is displayed by using the shader. In some embodiments, the particle attribute updating module 850 does not need to update the particles in each frame, and may set an updating cycle of the particles as needed. For example, an updating cycle of particles for simulating and describing an object distant from a visual angle may be once every two frames or once every three times.

In some embodiments, the particle attribute updating module 850 may update the particle attributes related to the state according to the force-bearing state of the target particle system. The force-bearing state of the target particle system may be processed by the CPU and then be transmitted to the GPU. For example, while periodically sending general information of the target particle system to the GPU, the CPU also sends the force-bearing state of the target particle system to the GPU.

In some embodiments, the particle attribute updating module 850 may alternatively update the particle attributes of the particles of the target particle system according to key frame data of the target particle system. The key frame data of the target particle system includes a position of displayed object, a rate of change, or a displayed color at corresponding time of at least one key frame. When the corresponding time of the key frame is reached, the particle attribute updating module 850 may determine the position information of the target particle system according to the position of displayed object at the corresponding time of the key frame, may adjust positions of the particles to position of displayed object displayed in the key frame, and similarly, may adjust the velocity information of the target particle system in a unified manner according to the rate of change at the corresponding time of the key frame and may adjust colors of the particles of the target particle system in a unified manner according to the displayed color at the corresponding time of the key frame, thereby implementing precise control over the particles of the target particle system.

In some embodiments, the particle attribute updating module 850 is for example configured to update the position information of a particle saved in a corresponding position render target and the velocity information of the particle saved in a corresponding velocity render target.

Figure 11:
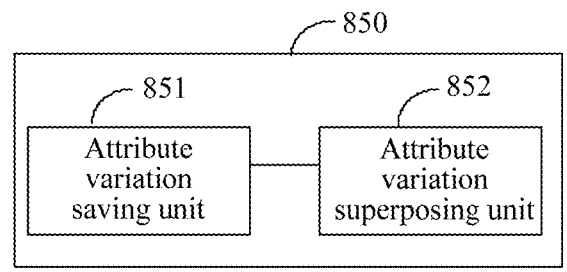
FIG. 11 is a schematic structural diagram an particle attribute updating module according to an embodiment of the present disclosure.

For example, as shown in FIG. 11, the particle attribute updating module 850 includes:

an attribute variation saving unit 851, configured to: calculate, according to a force-bearing state of the target particle system, attribute variations of particle attributes of a particle that are related to the force-bearing state in the target particle system, and save the attribute variations in a temporary render target, where the attribute variations include a position variation and a velocity variation; and an attribute variation superposing unit 852, configured to: superpose the position variation in the temporary render target on the position information in the position render target of the corresponding particle, and superpose the velocity variation in the temporary render target on the velocity information in the velocity render target of the corresponding particle.

For example, when the position information saved in the position render target before updating is u1, and a position increment obtained by means of calculation is u, the position information saved in the position render target after the updating is u2=u1+u; similarly, when the velocity information saved in the velocity render target before the updating is v1, and a velocity increment obtained by means of calculation is v, the velocity information saved in the velocity render target after the updating is v2=v1+v, where u and v are saved by using the temporary render target.

Refer to FIG. 8 for an updating processing procedure. The gray area is a core of an algorithm for reducing RTs. A TempRT saves an increment and does not read a result saved in a previous frame, and the TempRT may be released after updating. Compared with a classic algorithm, two RTs are reduced, and two steps of add to Pass are added.

In some embodiments, the processing apparatus for a particle system further includes:

a target resource allocating module 860, configured to allocate render target resources for the target particle system according to a maximum particle emissivity and a maximum life cycle of the target particle system.

For example, the GPU may allocate the render target resources for the target particle system according to a maximum quantity of particles that exist in the target particle system at the same time, where the maximum quantity of particle=a maximum particle emissivity*a maximum life cycle. Then, the RT resources required by the target particle system may be determined according to the quantity of particle attributes stored in each RT resource. For example, in some embodiments, each RT (a PosRT or a VelocityRT) is in a format of RGBA32f. An occupied video memory is 0.125 M to 16 M, and correspondingly, particle attributes of 8192 to 100 W particles can be stored. The CPU may place a maximum particle emissivity and a maximum life cycle of the target particle system into the general attribute information of the target particle system and send the information to the GPU. The GPU allocates the render target resources for the target particle system.

Then, to reduce fragments generated by the allocation and recovery, a multi-order linked list may be established to manage idle render target resources, and then the render target resources are allocated for the target particle system from the idle render target resources according to a buddy algorithm. For example, as shown in FIG. 9, 0 to 9 identify orders of an order linked list. A management size of an n-order linked list includes 1*2n RT resources. That is, the size of RT blocks managed by each order linked list is double of that of RT blocks managed by an upper order. However, in the n-order linked list, the RT resources may further be divided into a plurality of subblocks. For example, 1*2n RT resources may be divided into 2*2n−1 RT resources. When the order linked list is used to manage the allocation, when the target particle system requires four RTs, checking is started from the order linked list whose block size is 4. when there is an idle block in the linked list, an RT resource block whose size is 4 may be directly allocated to a user, otherwise checking is performed on a lower order (the block size is 8) linked list; when there is an idle resource block in the linked list whose size of managed RT resource blocks is 8, the idle RT resource block is split into two resource blocks whose size is 4, where one RT resource block whose size is 4 is allocated to the target particle system, and the other resource block whose size is 4 is added to the upper order linked list, and so on. However, when the target particle system releases the RT resources, when currently there is an idle RT resource block whose size is the same as that of an RT resource block released by the target particle system, the two RT resource blocks having the same size are combined and placed in a lower order linked list. For example, when the target particle system releases an RT resource block whose size is 4, and when an idle RT resource block whose size is 4 is found, the two RT resource blocks may be combined into an RT resource block whose size is 8, and the combined RT resource block is placed in a linked list whose size of managed RT resource blocks is 8, and so on.

In some embodiments, the CPU may alternatively allocate the render target resources for the target particle system, and inform the GPU of the RT resources allocated to the target particle system.

In some embodiments, the apparatus further includes:

a pattern information receiving module 880, configured to receive pattern information of the target particle system sent by the CPU, where the pattern information includes pixel position information and a generation time of each pixel.

In some embodiments, the CPU may add the pattern information (for example, a color image) of the target particle system to a specified storage space, for example, in a memory, a hard disk or a video memory, and the pattern information receiving module 880 loads the pattern information from the specified storage space.

RGB For example, the CPU may generate a color image according to a B/W image. Pixels in the B/W image are traversed one by one. When a pixel color is greater than 0 (non-black), an RGB channel of a pixel in the color image is used to record position information of the pixel whose color is greater than 0, and a alpha channel of the pixel is used to record information of the pixel whose color is greater than 0, for example, a generation time and a display time, so that the position and time information of each pixel whose color is greater than 0 is saved in each pixel of the color image. The CPU sends the obtained pattern information of the color image to the GPU.

Exemplarily, as shown in a B/W image of FIG. 12, an RGB channel of the B/W image is presented on a left side 1201, and an alpha channel of the B/W image is presented on a right side 1202. The CPU may generate and obtain a color image 1203 on a right side according to position information in the RGB channel of the B/W image and time information in the alpha channel of the B/W image. Colors of pixels in the color image are determined according to positions of non-zero pixels of the B/W image. An alpha channel of each pixel records information of a pixel whose color is greater than 0, for example, a generation time and a display time.

In some embodiments, the B/W image may be an image having a text pattern.

Similarly, the CPU may alternatively generate the color image according to a three-dimensional model image (3D grid image). Similarly, an RGB channel of a pixel of the color image stores position coordinates of a vertex in the three-dimensional model image.

For example, a B/W image based on which the CPU generates a color pattern may be a text pattern. Because the resolution (default 32*32) of an image generated based on the text pattern is very low, the image may be generated in real time.

The particle attribute initialization module 820 is further configured to:

initialize, according to the pixel position information and the generation time of each pixel in the pattern information and in combination with the general attribute information of the target particle system, the position information and the generation time of the particles of the target particle system. Subsequently, the GPU may restore an original image corresponding to the pattern information on the screen, for example, the foregoing target B/W image or three-dimensional model image, thereby determining display positions and generation time of the particles of the particle system according to pixel position information and generation time of pixels that are extracted from the pattern information, to implement more elaborate particle display control.

According to one embodiment of the present disclosure, the processing apparatus for a particle system generates particles after receiving general attribute information of a particle system sent by the CPU, and displays the generated particles and manages a life cycle. According to one embodiment of the present disclosure, data transmission between the GPU and the CPU is greatly reduced, and times and a frequency of the GPU of waiting for data transmission of the CPU are reduced, thereby improving the processing efficiency of the particle system. On the other hand, when updating particle attributes, the CPU usually needs two or more pairs of RTs to save position information and velocity information of particles in a current frame and in a previous frame. However, in one embodiment of the present disclosure, when updating particle attributes, the processing apparatus for a particle system only needs to save increments of velocity information and position information. Therefore, at least one position render target and one velocity render target may be reduced, and only a temporary render target needs to be added. However, the temporary render target may be released after the updating. Especially in a processing process of the particle system having a huge quantity of particles, a large quantity of video memory resources may be reduced.

Figure 13:
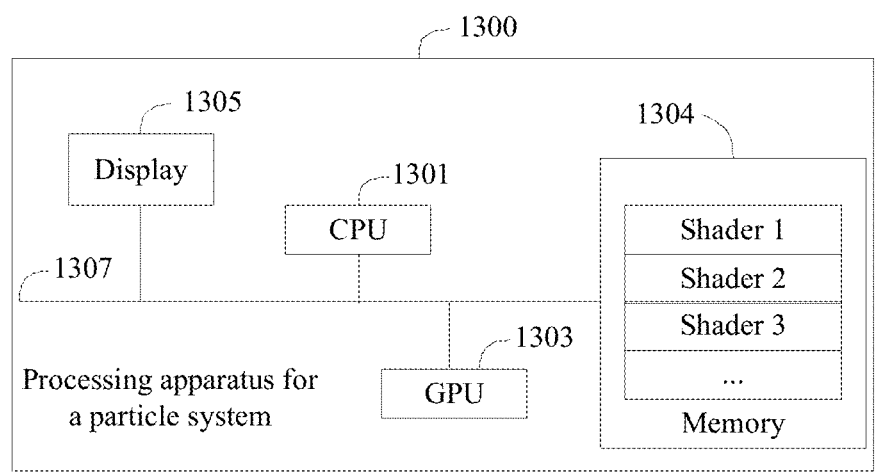
FIG. 13 is a schematic structural diagram of a processing apparatus for a particle system according to another embodiment of the present disclosure.

FIG. 13 is a schematic structural diagram of a processing apparatus for a particle system according to another embodiment of the present disclosure. As shown in the figure, in one embodiment, the processing apparatus 1300 for a particle system may include at least one CPU 1301, a GPU 1303, a memory 1304, a display 1305, and at least one communications bus 1307. The communications bus 1307 is configured to implement connection and communication between the components. The memory 1304 includes at least one shader. When the at least one shader is implemented by the GPU 1303, the following operations are performed:

receiving general attribute information of a target particle system sent by a CPU, the general attribute information of the target particle system including a particle display range, a particle life cycle range, a particle velocity range, and a generation time;

generating particles of the target particle system according to the general attribute information of the target particle system, and initializing particle attributes of the particles of the target particle system, the particle attributes of each particle including position information, velocity information, life cycle and generation time of the particle; and displaying the particles of the target particle system according to the particle attributes of the particles in the target particle system.

In some embodiments, after the displaying the particles of the target particle system according to the particle attributes of the particles in the target particle system, the at least one shader may further be configured to perform the following operations:

determining whether a particle is dead according to the life cycle and the generation time of the particle of the target particle system; and when the particle is dead, stopping displaying the particle.

In some embodiments, the at least one shader may further be configured to perform the following operations:

updating, when the particles are still in the life cycle, the particle attributes of the particles of the target particle system, and displaying the updated particles of the target particle system.

In some embodiments, the at least one shader is configured to perform the operation of initializing particle attributes of the particles of the target particle system, for example including:

saving the position information and the generation time of the particles in a position render target, and saving the velocity information and the life cycle of the particles in a velocity render target;

the at least one shader is configured to perform the operation of displaying the particles of the target particle system according to the particle attributes of the particles in the target particle system, including:

displaying a corresponding particle by sampling the position information saved in the position render target and the velocity information saved in the velocity render target of the particle; and the at least one shader is configured to perform the operation of updating the particle attributes of the particles of the target particle system, for example including:

updating the position information saved in the position render target and the velocity information saved in the velocity render target of the particles.

In some embodiments, the at least one shader is configured to perform the operation of updating the position information saved in the position render target and the velocity information saved in the velocity render target of the particles, for example including:

calculating, according to a force-bearing state of the target particle system, attribute variations of particle attributes of a particle that are related to the force-bearing state in the target particle system, and saving the attribute variations in a temporary render target, where the attribute variations include a position variation and a velocity variation; and superposing the position variation in the temporary render target on the position information in the position render target of the corresponding particle, and superposing the velocity variation in the temporary render target on the velocity information in the velocity render target of the corresponding particle.

In some embodiments, the general attribute information of the target particle system further includes a maximum particle emissivity and a maximum life cycle; and before the saving the position information and the generation time of the particles in a position render target, and saving the velocity information and the life cycle of the particles in a velocity render target, the at least one shader is further configured to perform the following operation:

allocating render target resources for the target particle system according to the maximum particle emissivity and the maximum life cycle of the target particle system.

In some embodiments, the at least one shader is configured to perform the operation of allocating render target resources for the target particle system according to the maximum particle emissivity and the maximum life cycle of the target particle system, for example including:

allocating the render target resources for the target particle system from idle render target resources according to a multi-order linked list that manages the idle render target resources and a buddy algorithm.

In some embodiments, the general attribute information further includes key frame data of the target particle system, where the key frame data of the target particle system includes a position of displayed object, a rate of change or a displayed color at a corresponding time of at least one key frame; and the at least one shader is configured to perform the following operation:

initializing or updating the particle attributes of the particles of the target particle system according to the key frame data of the target particle system.

In some embodiments, before performing the operation of initializing particle attributes of the particles of the target particle system, the at least one shader is further configured to perform the following operation:

receiving pattern information of the target particle system sent by the CPU, where the pattern information carries pixel position information and a generation time of each pixel; and the at least one shader is configured to perform the operation of initializing the particle attributes of the particles of the target particle system, for example including:

initializing, according to the pixel position information and the generation time of each pixel in the pattern information and in combination with the general attribute information of the target particle system, the position information and the generation time of the particles of the target particle system.

In some embodiments, the at least one shader may include the general attribute information receiving module 810, the particle attribute initialization module 820 and the particle display module 830 shown in FIG. 10.

According to the embodiments of the present disclosure, the GPU generates particles after receiving general attribute information of a particle system sent by the CPU, and displays the generated particles and manages a life cycle. According to the embodiments of the present disclosure, data transmission between the GPU and the CPU is greatly reduced, and the time and a frequency of the GPU of waiting for data transmission of the CPU are reduced, thereby improving the processing efficiency of the particle system.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

The foregoing descriptions are merely preferred embodiments of the present disclosure, but are not intended to limit the present disclosure. Any modification, equivalent replacement and improvement made within the spirit and principle of the present disclosure shall fall within the protection scope of the present disclosure.

What is claimed is:

1. A processing method for a particle system, comprising:
receiving general attribute information of a target particle system sent by a central processing unit (CPU), the general attribute information of the target particle system comprising a particle display range, a particle life cycle range, a particle velocity range, a generation time, a maximum particle emissivity, and a maximum life cycle;
generating particles of the target particle system according to the general attribute information of the target particle system;
initializing particle attributes of the particles of the target particle system, the particle attributes of each particle comprising position information, velocity information, a life cycle and a generation time of the particle, comprising:
allocating render target resources for the target particle system according to the maximum particle emissivity and the maximum life cycle of the target particle system; and
saving the position information and the generation time of the particles in a position render target, and saving the velocity information and the life cycle of the particles in a velocity render target; and
displaying the particles of the target particle system according to the particle attributes of the particles in the target particle system, comprising: displaying a particle by sampling the position information saved in the position render target and the velocity information saved in the velocity render target of the corresponding particle;
determining whether the particle is dead according to the life cycle and the generation time of the particle of the target particle system;
updating, when the particles are still in the life cycle, the position information saved in the position render target and the velocity information saved in the velocity render target of the particles; and
displaying the updated particles of the target particle system based on the updated position information and the updated velocity information of the particles.

2. The processing method for the particle system according to claim 1, wherein, after the displaying the particles of the target particle system, the method further comprises:
when the particle is dead, stopping displaying the particle.

3. The processing method for the particle system according to claim 1, wherein the updating the position information saved in the position render target and the velocity information saved in the velocity render target of the particles comprises:
calculating, according to a force-bearing state of the target particle system, attribute variations of particle attributes of a particle that are related to the force-bearing state in the target particle system, and saving the attribute variations in a temporary render target, wherein the attribute variations comprise a position variation and a velocity variation; and
superposing the position variation in the temporary render target on the position information in the position render target of the corresponding particle, and superposing the velocity variation in the temporary render target on the velocity information in the velocity render target of the corresponding particle.

4. The processing method for the particle system according to claim 1, wherein the allocating render target resources for the target particle system according to the maximum particle emissivity and the maximum life cycle of the target particle system comprises:

allocating the render target resources for the target particle system from idle render target resources according to a multi-order linked list that manages the idle render target resources and a buddy algorithm.

5. The processing method for the particle system according to claim 1, wherein the general attribute information further comprises key frame data of the target particle system, and the key frame data of the target particle system comprises a displayed object position of displayed object, a rate of change or a displayed color at a corresponding time of at least one key frame; and the method further comprises:
initializing or updating the particle attributes of the particles of the target particle system according to the key frame data of the target particle system.

6. The processing method for the particle system according to claim 1, wherein before the initializing particle attributes of the particles of the target particle system, the method further comprises:

receiving pattern information of the target particle system sent by the CPU, wherein the pattern information carries pixel position information and a generation time of each pixel; and the initializing the particle attributes of the particles of the target particle system comprises:

initializing, according to the pixel position information and the generation time of each pixel in the pattern information, in combination with the general attribute information of the target particle system, the position information and the generation time of the particles of the target particle system.

7. A processing apparatus for a particle system, the apparatus comprising:

a memory, storing instructions for a processing method for the particle system; and a graphics processing unit (GPU), connected to the memory and when the instructions being executed, configured to:

receive general attribute information of a target particle system sent by a central processing unit CPU, the general attribute information of the target particle system comprising a particle display range, a particle life cycle range, a particle velocity range, a generation time, a maximum particle emissivity, and a maximum life cycle;

generate particles of the target particle system according to the general attribute information of the target particle system;

initialize particle attributes of the particles of the target particle system, the particle attributes of each particle comprising position information, velocity information, a life cycle and a generation time of the particle, comprising:

allocating render target resources for the target particle system according to the maximum particle emissivity and the maximum life cycle of the target particle system; and saving the position information and the generation time of the particles in a position render target, and saving the velocity information and the life cycle of the particles in a velocity render target; and display the particles of the target particle system according to the particle attributes of the particles in the target particle system, comprising: displaying a particle by sampling the position information saved in the position render target and the velocity information saved in the velocity render target of the corresponding particle;

determining whether the particle is dead according to the life cycle and the generation time of the particle of the target particle system;

updating, when the particles are still in the life cycle, the position information saved in the position render target and the velocity information saved in the velocity render target of the particles; and displaying the updated particles of the target particle system based on the updated position information and the updated velocity information of the particles.

8. The processing apparatus according to claim 7, wherein the GPU is further configured to:

when the particle is dead, stop displaying the particle.

9. The processing apparatus for a according to claim 7, wherein the GPU is further configured to:

calculate, according to a force-bearing state of the target particle system, attribute variations of particle attributes of a particle that are related to the force-bearing state in the target particle system, and save the attribute variations in a temporary render target, wherein the attribute variations comprise a position variation and a velocity variation; and superpose the position variation in the temporary render target on the position information in the position render target of the corresponding particle, and superpose the velocity variation in the temporary render target on the velocity information in the velocity render target of the corresponding particle.

10. The processing apparatus according to claim 7, wherein the GPU is further configured to:

allocate the render target resources for the target particle system from idle render target resources according to a multi-order linked list that manages the idle render target resources and a buddy algorithm.

11. The processing apparatus according to claim 7, wherein:

the general attribute information further comprises key frame data of the target particle system, and the key frame data of the target particle system comprises a displayed objectposition of displayed object, a rate of change or a displayed color at corresponding time of at least one key frame; and the GPU is further configured to:
initialize the particle attributes of the particles of the target particle system according to the key frame data of the target particle system; and update the particle attributes of the particles of the target particle system according to the key frame data of the target particle system.

12. The processing apparatus according to claim 7, wherein the GPU is further configured to:

receive pattern information of the target particle system sent by the CPU, wherein the pattern information comprises pixel position information and a generation time of each pixel; and initialize, according to the pixel position information and the generation time of each pixel in the pattern information, in combination with the general attribute information of the target particle system, the position information and the generation time of the particles of the target particle system.

13. A non-volatile machine-readable storage medium storing computer program instructions executable by a graphics processing unit (GPU) to perform:

receiving general attribute information of a target particle system sent by a central processing unit CPU, the general attribute information of the target particle system comprising a particle display range, a particle life cycle range, a particle velocity range, a generation time, a maximum particle emissivity, and a maximum life cycle;

generating particles of the target particle system according to the general attribute information of the target particle system;

initializing particle attributes of the particles of the target particle system, the particle attributes of each particle comprising position information, velocity information, a life cycle and a generation time of the particle, comprising:

allocating render target resources for the target particle system according to the maximum particle emissivity and the maximum life cycle of the target particle system; and saving the position information and the generation time of the particles in a position render target, and saving the velocity information and the life cycle of the particles in a velocity render target; and displaying the particles of the target particle system according to the particle attributes of the particles in the target particle system, comprising: displaying a particle by sampling the position information saved in the position render target and the velocity information saved in the velocity render target of the corresponding particle;

determining whether the particle is dead according to the life cycle and the generation time of the particle of the target particle system;

updating, when the particles are still in the life cycle, the position information saved in the position render target and the velocity information saved in the velocity render target of the particles; and displaying the updated particles of the target particle system based on the updated position information and the updated velocity information of the particles.

14. The storage medium according to claim 13, wherein the computer program instructions further cause the GPU to perform:

when the particle is dead, stopping displaying the particle.

15. The storage medium according to claim 13, wherein the updating the position information saved in the position render target and the velocity information saved in the velocity render target of the particles comprises:

calculating, according to a force-bearing state of the target particle system, attribute variations of particle attributes of a particle that are related to the force-bearing state in the target particle system, and saving the attribute variations in a temporary render target, wherein the attribute variations comprise a position variation and a velocity variation; and superposing the position variation in the temporary render target on the position information in the position render target of the corresponding particle, and superposing the velocity variation in the temporary render target on the velocity information in the velocity render target of the corresponding particle.

16. The storage medium according to claim 13, wherein the allocating render target resources for the target particle system according to the maximum particle emissivity and the maximum life cycle of the target particle system comprises:

allocating the render target resources for the target particle system from idle render target resources according to a multi-order linked list that manages the idle render target resources and a buddy algorithm.

17. The storage medium according to claim 13, wherein the general attribute information further comprises key frame data of the target particle system, and the key frame data of the target particle system comprises a displayed object position of displayed object, a rate of change or a displayed color at a corresponding time of at least one key frame; and the computer program instructions further cause the GPU to perform:

initializing or updating the particle attributes of the particles of the target particle system according to the key frame data of the target particle system.

18. The storage medium according to claim 13, wherein before the initializing particle attributes of the particles of the target particle system, the computer program instructions further cause the GPU to perform:

receiving pattern information of the target particle system sent by the CPU, wherein the pattern information carries pixel position information and a generation time of each pixel; and the initializing the particle attributes of the particles of the target particle system comprises:

initializing, according to the pixel position information and the generation time of each pixel in the pattern information, in combination with the general attribute information of the target particle system, the position information and the generation time of the particles of the target particle system.

* * * * *